United States Patent [19]

Blanke et al.

[11] Patent Number: 5,069,824

[45] Date of Patent: Dec. 3, 1991

[54] OXIDES OF THE PYROCHLORE FAMILY AND ELECTRICALLY RESISTANT MATERIALS THAT CONTAIN THEM

[75] Inventors: Inge Blanke, Bad Laer; Hans-Georg Burckhardt, Frankfurt; Frieder Gora; Karlheinz Guldner, both of Aschaffenburg; Jurgen Dehoust, Hanau; Christina Modes, Darmstadt; Sybille Kemmler-Sack, Tubingen; Joachim Schmidt, Hanau, all of Fed. Rep. of Germany

[73] Assignee: W.C. Heraeus GmbH, Hanau am Main, Fed. Rep. of Germany

[21] Appl. No.: 505,758

[22] Filed: Apr. 6, 1990

[30] Foreign Application Priority Data

May 5, 1989 [DE] Fed. Rep. of Germany ....... 3914844

[51] Int. Cl.$^5$ .............................................. H01B 1/06
[52] U.S. Cl. ................................... 252/518; 252/521; 423/593; 423/596; 524/401
[58] Field of Search ................ 252/518, 521; 423/593, 423/596; 524/401

[56] References Cited

U.S. PATENT DOCUMENTS

| 3,583,931 | 6/1971 | Bouchard | 252/518 |
| 3,681,262 | 8/1972 | Bouchard | 252/518 |
| 3,896,055 | 7/1975 | Bouchard et al. | 252/518 |

FOREIGN PATENT DOCUMENTS

| 0110167 | 6/1984 | European Pat. Off. . |
| 1816105 | 12/1969 | Fed. Rep. of Germany . |
| 2403667 | 8/1974 | Fed. Rep. of Germany . |

*Primary Examiner*—Joesphine Barr
*Attorney, Agent, or Firm*—Sprung Horn Kramer & Woods

[57] ABSTRACT

Electrically conductive oxides of the pyrochlore family based on copper and/or silver, lead, bismuth, and ruthenium, characterized by the formula $M_xM'_y(Pb,Bi)_{2-x-y}Ru_2O_{7-z}$, wherein M = copper and/or silver, M' = calcium, strontium, and/or barium, $0 \leq x \leq 0.6$, $0.1 \leq y \leq 1.0$, and $0.1 \leq z \leq 1.0$.

13 Claims, No Drawings

OXIDES OF THE PYROCHLORE FAMILY AND ELECTRICALLY RESISTANT MATERIALS THAT CONTAIN THEM

BACKGROUND OF THE INVENTION

1. Field of the Invention

The present invention concerns electrically conductive oxides of the pyrochlore family based on copper and/or silver, lead, bismuth, and ruthenium, and electrically resistant materials that contain such oxides.

2. Description of the Related Art

A number of polynary oxides that contain ruthenium and bismuth, that have a pyrochlore crystalline structure, and that are appropriate because of their electrical properties as constituents of electrically resistant materials are known.

German Patent 1 816 105, for example, describes the electrically conductive stable bismuth ruthenate $Bi_2Ru_2O_7$ with a pyrochlore-crystal structure and similar oxides of the pyrochlore or pyrochlore-related structure that contain other metals in addition to bismuth and ruthenium. They are employed in conjunction with uroglass to manufacture resistors. The specific resistance of resistors manufactured with $Bi_2Ru_2O_7$ can be varied over a wide range maintaining a low temperature coefficient in the range of $+25°$ to $+125°$ C.

Electrically resistant materials that contain electrically conductive polynary oxides with a crystalline structure related to pyrochlore and of the general formula $M_xM'_{2-x}M''_2O_{7-z}$ wherein M is silver and/or copper, M' is bismuth or a mixture of at least ½ bismuth and up to ½ cadmium, lead, yttrium, thallium, indium and/or rare earth metal and M'' is ruthenium, iridium and/or a mixture of at least ¾ ruthenium and/or iridium and up to ¼ platinum and/or titanium and/or rhodium are described in German AS 2 403 667. The oxides are obtained by jointly heating the requisite oxides or readily oxidizing metals or salts to approximately 600° to 1200° C. subject to oxidizing conditions. At a proportion of 5 to 90% they constitute in conjunction with a glass frit or other appropriate inorganic binder the solid constituent of the resistant material, which also has a liquid organic carrier, a solution of ethyl cellulose in terpineol, for example, to render it susceptible to printing. Resistors with especially low specific resistances and a flat temperature response thereof can be obtained by firing the resistant material onto a dielectric substrate, aluminum oxide, for example, at approximately 650° to 950° C.

European Patent 110 167 concerns a method of manufacturing pyrochlore compounds of the general formula $Bi_{2-x}M_xB_2O_{7-z}$, wherein M=cadmium, copper, lead, indium, gadolinium, and/or silver and B=ruthenium and/or iridium. These compounds have an extensive specific surface and are appropriate for resistors with relatively low temperature coefficients of resistance in the range of $+25°$ to $+125°$ C. (Hot Temperature Coefficient of Resistance: HTCR). They can be manufactured by annealing a mixture of the bismuth-oxide carbonate $Bi_2O_2CO_3$, the dioxide of the ruthenium and/or iridium, and the carbonates of the other metals in an oxidizing atmosphere and purification the reaction product with a diluted aqueous mineral acid.

SUMMARY OF THE INVENTION

The object of the present invention is to make available an electrically conductive ruthenate with the aforesaid pyrochlore structure that is appropriate for manufacturing thick film resistors, whereby the difference ($\Delta TCR = HTCR - CTCR$) between the coefficient of resistance for temperatures in the range of $+25°$ to $+125°$ C. (HTCR) and the coefficient for temperatures in the range of $-55°$ to $+25°$ C. (Cold Temperature Coefficient of Resistance: CTCR) is as small as possible.

This object is attained with oxides of pyrochlore-related structure that are characterized by the formula $M_xM'_y(Pb,Bi)_{2-x-y}Ru_2O_{7-z}$, wherein M=copper and/or silver, M'=calcium, strontium, and/or barium, $0 \leq x \leq 0.6$, $0.1 \leq y \leq 1.0$, and $0.1 \leq z \leq 1.0$.

DESCRIPTION OF PREFERRED EMBODIMENTS

Preferably in the formula $M_xM'_y(Pb,Bi)_{2-x-y}Ru_2O_{7-z}$, $0.2 \leq x \leq 0.4$, $0.5 \leq y \leq 1.0$, and $0.1 \leq z \leq 1.0$.

Oxides wherein the stoichiometric ratio of lead to bismuth is higher than 1 and lower than 2 have been proven especially practical.

Oxides that contain lead and bismuth in the stoichiometric ratio of 1.5:1 and copper or silver are preferred.

The oxides can, as is in itself known (cf. e.g., European Patent 110 167), be produced by solid reaction or by reaction in the liquid phase. It has been proven especially practical to employ the corresponding metals, metal oxides, metal carbonates, or mixtures thereof as starting materials in powdered form and to anneal them in air at 700° to 1000° C.

The oxides, in conjunction with inorganic dielectric binders, constitute the solid portion of electrically resistant materials. Generally the solid portion is 5 to 90% by weight oxides and 10 to 95% by weight inorganic dielectric binder. Any binder, usually a glass frit, that is known for this purpose is appropriate for use in conjunction with the oxides in accordance with the invention. Resistant materials that contain the oxides along with lead-aluminosilicate or lead-aluminoborosilicate glass frits, preferably those that are 50 to 70% by weight PbO, 25 to 35% by weight $SiO_2$, 1 to 10% by weight $Al_2O_3$, and 1 to 10% by weight $B_2O_3$, have been proven especially useful.

The electrically resistant materials usually contain, in addition to the solids, a liquid carrier in the form of an organic medium and are accordingly present in the form of a paste that can be screen-printed onto the dielectric substrate. The liquid carrier is usually a solution of an organic polymer, an acrylic resin or ethyl cellulose, for example, in an organic solvent, terpineol or butyl carbitol (butyl-diglycol acetate), for example, as usually employed for electrically resistant pastes.

The resistant pastes are manufactured in a known way by mixing the constituents that comprise them. Once the paste has been printed onto the substrate, which consists of aluminum oxide, for example, and dried by evaporating the solvent, the substrate is fired in air at approximately 700° to 900° C. That the oxides do not decompose at these firing temperatures is evidenced by x-ray diffraction photographs of the fired-on layers.

The electrically resistant layers made out of materials that contain oxides in accordance with the invention are distinguished by low HTCR's and CTCR's and by small differences between them.

To facilitate comprehension of the invention the preparation of oxides, of electrically resistant pastes that contain one such oxide along with lead-aluminosilicate or lead-aluminoborosilicate glass frit, and of resistant layers produced from such pastes will now be described with reference to the following examples.

EXAMPLES

The pastes are characterized by determining the thickness d (in μm) of the dried layers and the resistance $R_f$ per unit of area (in kΩ/□), the temperature coefficient of resistance at +25° to +125° C. HTCR (in ppm/K), and the temperature coefficient of resistance at −55° to +25° C. CTCR (in ppm/K) of the layers obtained by firing the pastes onto aluminum oxide substrates.

EXAMPLE 1

$Ca_{0.85}Cu_{0.25}Pb_{0.5}Bi_{0.4}Ru_2O_{7-z}$ 34.03 g of $CaCO_3$, 7.96 g of CuO, 44.64 g of PbO, 37.28 g of $Bi_2O_3$, and 80.86 g of Ru are ground together in a ball mill. The resulting mixture is placed in a crucible made of $Al_2O_3$ and annealed for 10 hours at 750° C. and then for 10 more hours at 850° C. in a muffle kiln. The resultant reaction product is cooled and ground in a ball mill to a powder with a mean particle size of 6 to 8 μm. X-ray structural analysis of the reaction product discloses that it consists of a single phase with the structure of a pyrochlore. Table I lists interplanar spacing d and relative x-ray intensity $I/I_0$.

The specific resistance is determined by the four-point procedure at room temperature and at 77K from samples compressed out of the powdered oxide. It is $4.8 \cdot 10^{-4} \Omega$ cm at room temperature and $3.6 \cdot 10^{-4} \Omega$ cm at 77K.

TABLE I

| d | $I/I_0$ |
|---|---|
| 5,936407 | 0,9 |
| 3,847390 | 1,9 |
| 3,256802 | 1,3 |
| 3,082717 | 1,5 |
| 2,946986 | 100,0 |
| 2,757214 | 1,2 |
| 2,713802 | 4,5 |
| 2,551787 | 35,2 |
| 2,342925 | 4,0 |
| 2,322472 | 1,3 |
| 2,086605 | 0,5 |
| 1,997906 | 0,5 |
| 1,967362 | 1,5 |
| 1,924425 | 1,1 |
| 1,867236 | 0,5 |
| 1,804707 | 40,7 |
| 1,684467 | 0,5 |
| 1,583636 | 0,5 |
| 1,539132 | 33,4 |
| 1,473673 | 8,4 |
| 1,357084 | 0,5 |
| 1,276656 | 4,1 |
| 1,171152 | 9,6 |
| 1,141683 | 7,1 |

EXAMPLES 2 THROUGH 7

Additional oxides are prepared by the method described with reference to Example 1 and characterized along with the oxide from that example by their lattice constant a (in Å). The results are listed in Table II.

TABLE II

| Example | Oxide | a (in Å) |
|---|---|---|
| 1 | $Ca_{0.85}Cu_{0.25}Pb_{0.5}Bi_{0.4}Ru_2O_{7-z}$ | 10,212 |
| 2 | $Ca_{0.3}Cu_{0.6}Pb_{0.6}Bi_{0.5}Ru_2O_{7-z}$ | 10,236 |
| 3 | $Ca_{1.0}Cu_{0.2}Pb_{0.5}Bi_{0.3}Ru_2O_{7-z}$ | 10,215 |
| 4 | $Ca_{0.5}Cu_{0.25}Pb_{0.75}Bi_{0.5}Ru_2O_{7-z}$ | 10,230 |

TABLE II-continued

| Example | Oxide | a (in Å) |
|---|---|---|
| 5 | $Ca_{0.5}Ag_{0.25}Pb_{0.75}Bi_{0.5}Ru_2O_{7-z}$ | 10,243 |
| 6 | $Sr_{0.5}Cu_{0.25}Pb_{0.75}Bi_{0.5}Ru_2O_{7-z}$ | 10,258 |
| 7 | $Ba_{0.5}Cu_{0.3}Pb_{0.7}Bi_{0.5}Ru_2O_{7-z}$ | 10,250 |

EXAMPLE 8

Electrically resistant pastes a) A ratio of 3:1 of a mixture of 19% by weight of the oxide described with reference to Example 1 and 81% by weight of a glass frit consisting of 55% by weight of PbO, 32.9% by weight of $SiO_2$, 4.8% by weight of $B_2O_3$, and 4.1% by weight of $Al_2O_3$ with a mean particle size of 3 to 6 μm and a 10% solution of ethyl cellulose in butyl carbitol are worked into a paste on a roll mill. The paste is printed through a stainless steel screen (200 mesh) onto an $Al_2O_3$ substrate measuring $50 \times 50 \times 0.63$ mm, dried in air at 150° C. for 10 minutes, and fired in a belt furnace for 10 minutes at 850° C. (remaining in the furnace for a total of 1 hour).

The thickness of the dried layers, the sheet resistance per unit of area related to a dried layer of 25 μm thickness, the hot and cold temperature coefficients of resistance for the same thickness, and the difference between the latter two are listed in Table III.

b) A ratio of 3:1 of a mixture of 20% by weight of the oxide described with reference to Example 1 and 80% by weight of a glass frit consisting of 58.2 by weight of PbO, 33.5% by weight of $SiO_2$, 8.4% by weight of $B_2O_3$, and 3.1% by weight of $Al_2O_3$ with a mean particle size of 3 to 6 μm and a 10% solution of ethyl cellulose in butyl carbitol are worked into a paste on a roll mill. The paste is printed through a stainless steel screen (200 mesh) onto an $Al_2O_3$ substrate measuring $50 \times 50 \times 0.63$ mm, dried in air at 150° C. for 10 minutes, and fired in a belt furnace for 10 minutes at 850° C. (remaining in the furnace for a total of 1 hour).

The thickness of the dried layers, the sheet resistance per unit of area related to a dried layer of 25 μm thickness, the hot and cold temperature coefficients of resistance for the same thickness, and the difference between the latter two are listed in Table III. c) A ratio of 3:1 of a mixture of 25% by weight of the oxide described with reference to Example 1 and 75% by weight of a glass frit consisting of 64% by weight of PbO, 29% by weight of $SiO_2$, and 7% by weight of $Al_2O_3$ with a mean particle size of 3 to 6 μm and a 10% solution of ethyl cellulose in butyl carbitol are worked into a paste on a roll mill. The paste is printed through a stainless steel screen (200 mesh) onto an $Al_2O_3$ substrate measuring $50 \times 50 \times 0.63$ mm, dried in air at 150° C. for 10 minutes, and fired in a belt furnace for 10 minutes at 850° C. (remaining in the furnace for a total of 1 hour).

The thickness of the dried layers, the sheet resistance per unit of area related to a dried layer of 25 μm thickness, the hot and cold temperature coefficients of resistance for the same thickness, and the difference between the latter two are listed in Table III.

TABLE III

| Example No. | oxide/frit (pbw) | d (μm) | $R_f$ (kΩ/□) | HTCR (ppm/K) | CTCR (ppm/K) | Δ TCR (ppm/K) |
|---|---|---|---|---|---|---|
| 8 a | 19/81 | 28 | 1050 | +70 | +25 | 45 |
| 8 b | 20/80 | 30 | 1210 | +2 | −65 | 67 |

TABLE III-continued

| Example No. | oxide/frit (pbw) | d (/um) | $R_f$ (k$\Omega$/□) | HTCR (ppm/K) | CTCR (ppm/K) | $\Delta$ TCR (ppm/K) |
|---|---|---|---|---|---|---|
| 8 c | 25/75 | 25 | 1295 | −75 | −115 | 40 |

It will be appreciated that the instant specification and claims are set forth by way of illustration and not limitation, and that various modifications and changes may be made without departing from the spirit and scope of the present invention.

What is claimed is:

1. An electrically conductive oxide of the pyrochlore family consisting essentially of (a) at least one of copper and silver, (b) at least one of calcium, strontium, and barium, (c) lead, (d) bismuth, (e) ruthenium, and (f) oxygen of the formula $$M_xM'_y(Pb,Bi)_{2-x-y}Ru_2O_{7-z}$$

wherein M is at least one of copper and silver, M' is at least one of calcium, strontium, and barium, and $0.2 \leq x \leq 0.6$, $0.1 \leq y \leq 1.0$, and $0.1 \leq z \leq 1.0$.

2. An oxide according to claim 1, wherein x, y and z are such that $0.2 \leq x \leq 0.4$, $0.5 \leq y \leq 1.0$, and $0.1 \leq z \leq 1.0$.

3. An oxide according to claim 1, wherein the stoichiometric ratio of lead to bismuth is higher than 1 and lower than 2.

4. An oxide according to claim 1, wherein the stoichiometric ratio of lead to bismuth is 1.5:1.

5. An oxide according to claim 1, wherein M is copper.

6. An oxide according to claim 1, wherein M is silver.

7. An oxide according to claim 1, wherein the formula is selected from the group consisting of $Ca_{0.85}Cu_{0.25}Pb_{0.5}Bi_{0.4}Ru_2O_{7-z}$, $Ca_{0.3}Cu_{0.6}Pb_{0.6}Bi_{0.5}Ru_2O_{7-z}$, $Ca_{1.0}Cu_{0.2}Pb_{0.5}Bi_{0.3}Ru_2O_{7-z}$, $Ca_{0.5}Cu_{0.25}Pb_{0.75}Bi_{0.5}Ru_2O_{7-z}$, $Ca_{0.5}Ag_{0.25}Pb_{0.75}Bi_{0.5}Ru_2O_{7-z}$, $Sr_{0.5}Cu_{0.25}Pb_{0.75}Bi_{0.5}Ru_2O_{7-z}$ and $Ba_{0.5}Cu_{0.3}Pb_{0.7}Bi_{0.5}Ru_2O_{7-z}$.

8. An electrically resistant material comprising an electrically conductive oxide of the pyrochlore family and an organic carrier, wherein the oxide is according to claim 1.

9. An electrically resistant material according to claim 8, which further comprises a glass frit.

10. An electrically resistant material according to claim 9, wherein the glass frit is a lead-aluminosilicate glass frit.

11. An electrically resistant material according to claim 9, wherein the glass frit is a lead-aluminoborosilicate glass frit.

12. An electrically resistant material according to claim 11, wherein the glass frit comprises 50 to 70% by weight PbO, 25-35% by weight $SiO_2$, 1-10% by weight $Al_2O_3$, and 1 to 10% by weight $B_2O_3$.

13. An electrically resistant material according to claim 9, wherein the material contains 5 to 90% by weight of the oxide and 10 to 95% by weight of the frit.

* * * * *